INVENTORS
Thomas B. Prickett
Clarence H. Thayer
BY Ira L. Nickerson
ATTORNEY

March 17, 1942.    T. B. PRICKETT ET AL    2,276,340
CATALYTIC REACTOR
Filed Jan. 25, 1939    2 Sheets-Sheet 2
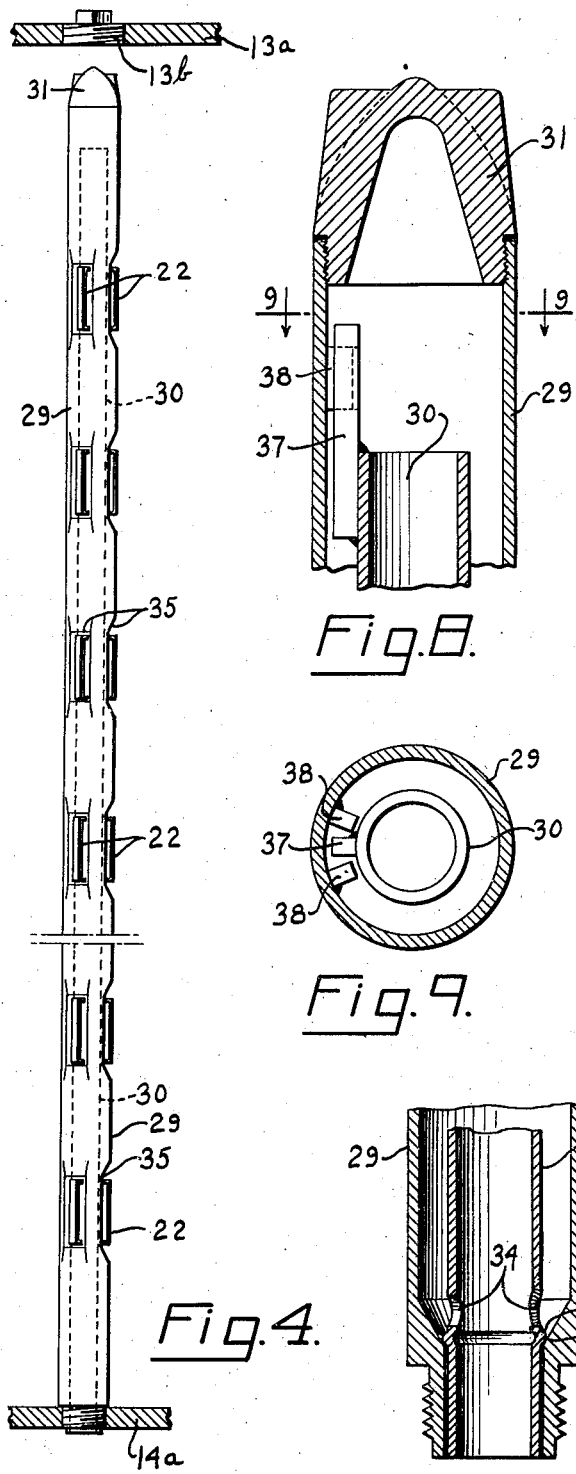
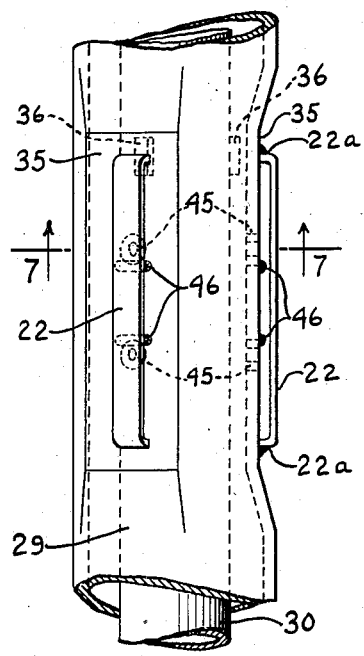
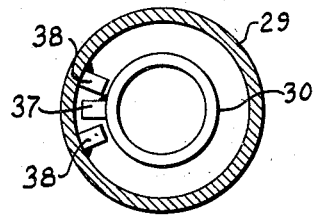
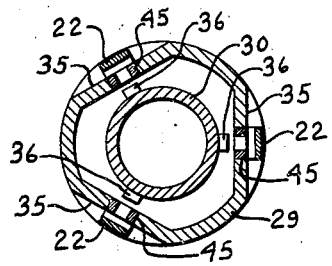
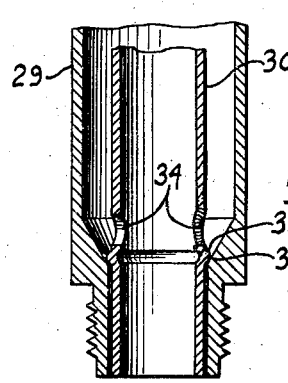
INVENTORS
Thomas B. Prickett
Clarence H. Thayer
BY Ira L. Nickerson
ATTORNEY Patented Mar. 17, 1942

2,276,340

UNITED STATES PATENT OFFICE 2,276,340

CATALYTIC REACTOR

Thomas B. Prickett, Woodbury, N. J., and Clarence H. Thayer, Wallingford, Pa., assignors, by direct and mesne assignments, to Houdry Process Corporation, Wilmington, Del., a corporation of Delaware Application January 25, 1939, Serial No. 252,716

12 Claims. (Cl. 23—288)

This invention relates to the promotion and control of chemical reactions, especially when effected in the presence or by the aid of contact material of catalytic or other nature disposed within the reaction zone. It involves improvements in structural details particularly in connection with means for effecting distribution of reactants and/or removal of reaction products. In certain respects it may be considered as an improvement on or further development of certain prior inventions, including that set forth in the copending application of R. C. Lassiat, Serial No. 36,278, filed August 15, 1935.

One object of the invention is to avoid completely or substantially to minimize interference with the feeding of reactants to the reaction zone and with the removal of products therefrom. Another object is to keep pieces of the contact material, or fragments or broken pieces of the same from actual contact with metered openings serving as inlets to or outlets from the reaction chamber. Another object is to change the direction of movement of fluid issuing from an orifice and to cause its diffusion into the mass of contact material. Still another object is to provide improved conduits and conduit units for use in chemical converters. Other objects will be apparent from the detailed description which follows.

The invention involves the disposing of a shield directly over an inlet or outlet orifice to prevent direct contact of the solid contact material with such orifice, to divert the flow of fluid to or from such orifice laterally of the same, and to effect diffused movement into the contact material of the full quantity of fluid permitted by the orifice. The shield or deflecting member is preferably mounted so as to facilitate mounting or removal of tubes or other distributing or outlet members provided with the metered orifices. The shield may be arranged to cover only one orifice or two or more orifices. When the orifices are grouped and arranged circumferentially of a tubular member, the shield may take the form of a sleeve encircling the tube but spaced therefrom with slots adjacent to each orifice and preferably on opposite sides thereof. To avoid projections on tubular distributing or outlet members, the orifices and the shields thereover may be mounted in depressed portions of such tubular members.

In order to illustrate the invention and the manner of its use, concrete embodiments thereof are shown in the accompanying drawings, in which:

Fig. 4 is an elevational view of a modified form of conduit unit with associated parts of the upper and lower tube sheets of a converter shown in section;

Fig. 5 is a vertical sectional view on an enlarged scale of the lower end of the conduit unit shown in Fig. 4;

Fig. 6 is a fragmentary, broken-away, elevational view of a portion of the same conduit unit, but on a slightly larger scale than Fig. 5;

Fig. 7 is a transverse sectional view substantially on the line 7—7 of Fig. 6;

Fig. 8 is a vertical sectional view of the upper end of the conduit unit on the same scale as Fig. 6; and Fig. 9 is a transverse sectional view on the line 9—9 of Fig. 8.

Figure 1:
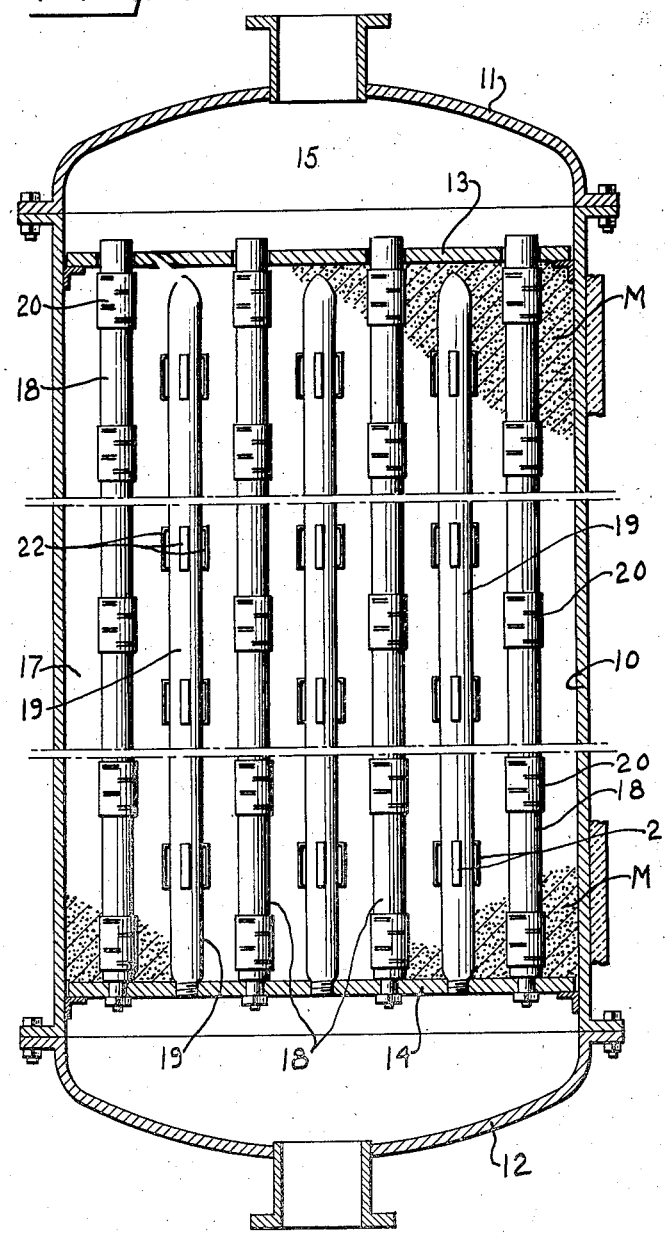
Fig. 1 is a vertical sectional view through a chemical converter showing distributing and outlet conduits in elevation.

The chemical converter shown in Fig. 1 for the purpose of illustration comprises a cylindrical casing 10 provided with upper and lower closure members 11 and 12 and having, on its interior, transverse partitions or tube sheets 13 and 14 dividing the same into upper and lower manifolding chambers 15 and 16 and a large central reaction chamber 17 which is adapted to be filled with solid contact or catalytic material M in the form of bits, fragments, or molded pieces utilized to promote, enter into or in any way assist in the desired reaction. For uniformity of operation, two series of conduits 18 and 19, respectively, are mounted in symmetrical arrangement within reaction chamber 17 to effect substantially uniform distribution of reactants in and removal of reaction products from mass M. Either series of conduits may be used as inlets or outlets, and they may vary in function with different reactions. As shown, both series of conduits are mounted in lower tube sheet 14, conduits 19 communicating through the latter with manifolding chamber 16, while conduits 18 extend through upper tube sheet 13 to communicate with the upper manifolding chamber 15, as, for example, in the manner disclosed in U. S. Patent No. 2,108,087, issued February 15, 1938, to C. H. Thayer.

Conduits 18 and 19 may be single tubes or of the double or nested tube type, as may be desired, but they are provided with metering orifices for controlling the movement of fluid into and out of the reaction chamber. The orifices may be distributed along the conduits as may be necessary or desirable to control the operating conditions in reaction chamber 17. In the forms shown, the orifices are disposed in groups and at intervals along the length of the conduits, the groups of orifices in conduit series 18 alternating with those in conduit series 19 to effect a somewhat more extended path of movement of fluid through contact mass M than the distance between adjacent individual tubes of the two series.

Figure 3:
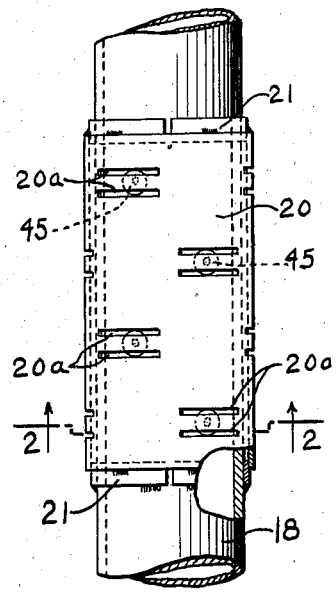
Fig. 3 is a fragmentary elevational view of the same conduit on the same scale as Fig. 2.
Figure 2:
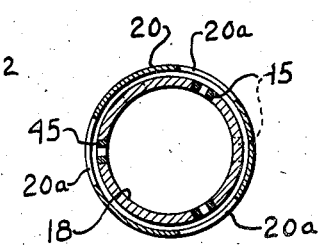
Fig. 2 is a transverse sectional view on an enlarged scale through one of the conduits in the converter, substantially on broken line 2—2 of Fig. 3.

Means are provided for shielding the orifices in the conduits 18 and 19 so as to prevent partial blocking of the same by pieces or fragments of the contact mass M which might rest over or wedge into the orifices and restrict flow of fluids through the orifice, thus producing pressure variation at the orifices, the means also providing a baffling surface to change the direction of flow immediately adjacent the orifices and to facilitate diffusion of reactants into contact material M. Preferred forms of shielding means are illustrated. For the conduits 18, the shielding means take the form of sleeves 20 encircling each conduit at spaced intervals and covering the groups of metering orifices therein (Figs. 1, 2 and 3). As indicated in Fig. 3, each shielding sleeve 20 is in slightly spaced relation to its conduit 18, the sleeve having at opposite ends split rings 21 serving as spacing members and suitably secured, as by welding, to sleeve 20 in partly telescoping relation with the same. One of the split rings, as the lower in Fig. 3, is secured to conduit 18, as by welding, thereby mounting sleeve 20 in fixed relation upon the conduit but leaving the other end of the sleeve free for any relative movement due to temperature changes. To promote diffusing movement of fluid into or from mass M, sleeves 20 are provided with elongate slots or saw-cuts 20a. These slots are not disposed directly over the metering orifices but rather on opposite sides of each orifice in conduit 18 so that each orifice has directly above it a baffling or deflecting surface only slightly wider than the orifice but of substantially greater area. For structural strength in sleeves 20 slots 20a are arranged transversely of the sleeve but functionally they will operate equally well if disposed at some other angle.

When it is desired that the fluid entering or leaving a metering orifice shall do so in a direction generally transverse to the conduit, rather than in a generally axial direction, as provided by the transverse slots 20a in shielding sleeves 20, the shielding means may take the form of relatively narrow ribs or strips 22 extending axially of the conduit and mounted directly over one or more metering orifices, as shown on conduits 19 of Fig. 1, and on a somewhat larger scale and in more detail in Fig. 6. These strips have bent ends 22a which may be welded directly to the conduit and are of appropriate height to mount the strip 22 as a baffling member at the desired distance from the metering orifices over which the shielding strip extends. Since shielding sleeve 20 and shielding strips 22 perform substantially the same function in substantially the same manner, either type of shield may be utilized for all the metering orifices on all of the fluid distributing and outlet conduits mounted in the reaction chamber, or both types of shields may be utilized on the same conduit. Either type of shield facilitates movement of the conduit within the contact mass and withdrawal of the conduit from the reaction chamber with a minimum of interference by the contact material surrounding the conduit.

Heat exchange means, utilizing an extraneous heat exchange medium to add heat for endothermic reactions or to remove heat of exothermic reactions, may be associated with the converter shell and with the conduits in the reaction chamber or independent of such conduits for the purpose of still more effective control of reaction conditions, but since such heat exchange means form no part of the present invention, disclosure thereof is omitted.

A modified form of conduit or conduit unit is illustrated in Figs. 4 to 9, inclusive. This unit is of the nested type comprising an outer conduit 29 and an inner conduit 30 mounted loosely in place. The inner conduit is open at both ends, and is readily insertable within outer conduit 29 by removing the upper domed cap 31 on the latter, the extension of inner conduit 30 within outer conduit 29 being limited by a beaded portion 32 forming an abutment which engages an inwardly tapered shoulder 33 (Fig. 5) adjacent the lower end of outer conduit 29. Inner conduit 30 may have one or more ports 34 adjacent beaded portion 32 so that communication is established between inner conduit 30 and outer conduit 29 at both ends of the latter. Outer conduit 29, like conduit 19 of Fig. 1, for which it may be substituted, is arranged for screw-threaded mounting in the lower tube sheet 14a of a converter to communicate through the latter with the manifolding chamber therebelow. The upper domed end 31 of the unit is disposed in spaced relation to the upper tube sheet 13a which may have an aperture in line with outer conduit 29, which aperture is closed by a screw cap 13b. By removing cap 13b access may be had to unit 29 without requiring the removal of tube sheet 13a, as is necessary in the case of tube sheet 13 of the converter shown in Fig. 1. In fact, the conduit unit 29 can be entirely withdrawn through the aperture in upper tube sheet 13a, since all metering orifices and shielding means therefor are mounted in depressed portions or flattened areas 35 of outer conduit 29, the shielding strips 22 being entirely within the annular exterior projection of outer conduit 29, as is clear from Figs. 4, 6 and 7. It is important that inner conduit 30 be maintained in properly centered relation to outer conduit 29, and, for this purpose, it is provided at intervals with centering projections 36 (Figs. 6 and 7), which engage the interior surfaces of the depressed portions 35 of outer conduit 29, but at points somewhat removed from the metering orifices in outer conduit 29. To prevent rotary displacement of inner conduit 30 so that the centering projections 36 would fail to engage the depressed portions 35 of outer conduit 29, suitable cooperating means are provided on both members of the nested unit or assembly. The illustrated means for this purpose comprises a vertical stop member or rib 37 welded to the upper end of inner conduit 30 (Figs. 8 and 9), which is received between spaced lugs 38 welded to the upper end of outer conduit 29 in position to receive stop rib 37 therebetween. The domed cap 31 on unit 29, like the domed ends on conduits 19 of Fig. 1, facilitates movement within the mass of contact material especially when the contact material entirely covers the free end of the unit or conduit.

While the metering orifices in all of the conduits herein illustrated may take the form of mere apertures in the conduits, the permanency of the quantity of flow of reactants is preferably insured by providing the conduits with perforated discs or buttons 45 of corrosion and erosion resistant material, after the manner disclosed in the copending application of E. J. Houdry and R. C. Lassiat, Serial No. 740,024, filed August 15, 1934, now Patent No. 2,234,169 issued March 11, 1941. These buttons have a tight driven fit with apertures in the various conduits, and are then welded in place as indicated at 46 in Fig. 6.

We claim as our invention:

1. The combination with a bed of solid particles of contact material of a conduit having metering orifices therein for the passage of fluid, a deflector plate positioned directly over and closely adjacent each metering orifice, each deflector plate having substantially greater area than the area of each metering orifice and being constructed and arranged to provide elongate openings to cooperate in the flow of fluid between the orifices and contact material, said elongate openings being sufficiently narrow to prevent particles of contact material from entering the same and blocking the orifices and being of substantially greater area than the area of each orifice to prevent the particles of contact material from entirely blocking the elongate openings in order to insure the passage of fluid between the orifices and contact material, and all portions of said deflector plates being positioned close to and spaced substantially the same distance from the conduit to divert the flow of fluid from the orifices directly into the contact material.

2. The combination with a bed of solid contact material of a conduit embedded in said material and having metering orifices disposed in groups in said conduit, and shielding means in the form of a short, flat metal strips having bent ends secured to said conduit, each strip extending over at least two orifices and in slightly spaced relation to the same to keep said material out of direct contact with the orifices and to effect lateral movement of fluid to or from said orifices without pressure variations at said orifices and with a minimum loss of space for contact material.

3. The combination with a bed of solid contact material of a conduit embedded in said material and having metering orifices disposed in groups in said conduit, and shielding means in the form of a series of sleeves mounted at intervals on the exterior of said conduit and in slightly spaced relation with the latter, said sleeves covering each of said groups of orifices to keep said solid contact material away from said orifices and having slots therein to facilitate free movement of fluid between said material and said orifices and to avoid uneven pressure variations at said orifices.

4. The combination with a bed of solid contact material of a conduit embedded in said material and having metering orifices in its walls disposed in groups at intervals axially of said conduit for the distribution of fluid within said material or removal of fluid therefrom, shielding means comprising sleeves telescoped over said conduit with slight clearance so as to cover said metering orifices but not the unapertured portions of said conduit, said sleeves having slots therein, and means mounting said sleeves in said conduits in position to keep said contact material away from said metering orifices and to dispose the slots thereof on opposite sides of said orifices and not directly over said orifices.

5. The combination with a bed of solid contact material of a conduit embedded in said material for admitting fluid to or removing fluid from said bed, said conduit having depressed portions and at least one metering orifice in each of said depressed portions, and means providing a baffling surface over each said orifice and disposed entirely within the annular exterior projection of said conduit.

6. The combination with a bed of solid contact material of a conduit embedded in said material for admitting fluid to or removing fluid from said bed, said conduit having depressed portions and at least one metering orifice in each of said depressed portions, and a shielding member mounted axially of said conduit within each of said depressed portions thereof and providing an imperforate baffling surface directly over and in slightly spaced relation to said orifices.

7. A perforated conduit adapted to be embedded in a mass of solid contact material, discs of corrosion resistant material mounted in perforations of the conduit, each of said discs being provided with a metering orifice for the passage of fluid, a deflector plate positioned directly over and closely adjacent each metering orifice, each deflector plate having substantially greater area than the area of each metering orifice and being constructed and arranged to provide elongate openings to cooperate in the flow of fluid between the orifices and contact material, said elongate openings being sufficiently narrow to prevent particles of contact material from entering the same and blocking the orifices and being of substantially greater area than the area of each orifice to prevent the particles of contact material from entirely blocking the elongate openings in order to insure the passage of fluid between the orifices and contact material, and all portions of said deflector plates being positioned close to and spaced substantially the same distance from the conduit to divert the flow of fluid from the orifices directly into the contact material.

8. A conduit unit adapted to be embedded in a bed of solid contact material for distributing reactants therein or removing reactants therefrom, said unit comprising an outer conduit perforated at intervals throughout its length, and an inner conduit mounted loosely but centrally of said outer conduit with open ends disposed adjacent the ends of said outer conduit, discs with metering orifices mounted in the perforations of said outer conduit, low flat shields of strip material on the exterior of said outer conduit extending axially thereof and presenting baffling surfaces directly over said orifices, said shields being short and narrow with their ends bent at an angle and secured to the conduit to dispose the baffling surfaces of said shields so close to said metering orifices that bits of contact material cannot clog said orifices and a tapered cap on said outer conduit to facilitate movement of said unit in said bed of contact material and to give access to said inner conduit.

9. A conduit unit adapted to be embedded in a bed of solid contact material for distributing reactants therein or removing reactants therefrom, said unit comprising an outer conduit having one end closed by a removable and tapered cap, an open-ended inner conduit supported loosely within said outer conduit and insertable and removable through said capped end, said outer conduit having depressed portions at intervals throughout its length and metering orifices in said depressed portions, and means associated with the depressed portions of said outer conduit for centering said inner conduit therewithin.

10. A conduit unit adapted to be embedded in a bed of solid contact material for distributing reactants therein or removing reactants therefrom, said unit comprising an outer conduit having one end closed by a removable and tapered cap, an open-ended inner conduit supported loosely within said outer conduit and insertable and removable through said capped end, said outer conduit having depressed portions at intervals throughout its length and metering orifices in said depressed portions, means in said depressed portions of said outer conduit disposing baffling surfaces over and closely adjacent said orifices, and means preventing rotary and axial displacement of said inner conduit within said outer conduit.

11. A conduit unit adapted to be embedded in a bed of solid contact material for distributing reactants therein or removing reactants therefrom, said unit comprising an outer conduit having one end closed by a removable and tapered cap, an open-ended inner conduit supported loosely within said outer conduit and insertable and removable through said capped end, cooperating means on said conduits remote from the capped end of said outer conduit for positioning and centering said inner conduit relative to said outer conduit, said outer conduit having its exterior depressed at spaced points axially thereof and orifices in such depressed portions, and means associated with such depressed portions of said outer conduit for centering said inner conduit therewithin.

12. A conduit unit adapted to be embedded in a bed of solid contact material for distributing reactants therein or removing reactants therefrom, said unit comprising an outer conduit having one end closed by a removable and tapered cap, an open-ended inner conduit supported loosely within said outer conduit and insertable and removable through said capped end, said outer conduit having metering orifices at intervals, shielding means on said outer conduit disposing baffling surfaces over and closely adjacent said orifices to effect lateral movement of fluid to or from said orifices without pressure variations at said orifices and with a minimum loss of space for contact material, and cooperating means on said conduits centering said inner conduit within said outer conduit and limiting longitudinal movement of said inner conduit.

THOMAS B. PRICKETT.
CLARENCE H. THAYER.

CERTIFICATE OF CORRECTION.

Patent No. 2,276,340.   March 17, 1942.

THOMAS B. PRICKETT, ET AL.

It is hereby certified that error appears in the printed specification of the above numbered patent requiring correction as follows: Page 1, first column, line 13, after "1935" and before the period insert --(Patent No. 2,150,930, issued March 21, 1939); and that the said Letters Patent should be read with this correction therein that the same may conform to the record of the case in the Patent Office.

Signed and sealed this 5th day of May, A. D. 1942.

(Seal)

Henry Van Arsdale,
Acting Commissioner of Patents.